United States Patent [19]

Meinzer

[11] 4,321,989
[45] Mar. 30, 1982

[54] ENERGY ABSORBING IMPACT BARRIER

[75] Inventor: Lester N. Meinzer, Sacramento, Calif.

[73] Assignee: Meinco Mfg. Co., Sacramento, Calif.

[21] Appl. No.: 114,210

[22] Filed: Jan. 22, 1980

[51] Int. Cl.³ .............................................. F16F 7/12
[52] U.S. Cl. ...................................... 188/377; 256/1; 256/13.1
[58] Field of Search .................. 188/1 C, 377; 256/1, 256/13.1

[56] References Cited

U.S. PATENT DOCUMENTS

| | | | |
|---|---|---|---|
| 1,922,878 | 8/1933 | Boyle | 256/13.1 |
| 3,666,055 | 5/1972 | Walker et al. | 188/1 C |
| 3,674,115 | 7/1972 | Young et al. | 256/13.1 X |
| 3,842,944 | 10/1974 | Shiotani et al. | 188/1 C |
| 3,888,502 | 6/1975 | Felzer et al. | 188/1 C X |
| 3,944,187 | 3/1976 | Walker | 256/1 X |
| 3,967,704 | 7/1976 | Ogden | 188/1 C X |
| 3,982,734 | 9/1976 | Walker | 256/13.1 |
| 4,101,115 | 7/1978 | Meinzer | 188/1 C X |
| 4,138,093 | 2/1979 | Meinzer | 256/13.1 |

OTHER PUBLICATIONS

Hawley, G. G., *The Condenser Chemical Dictionary*, 8th Ed., Reinhold Co., Sep. 4, 1974, p. 844.

*Primary Examiner*—Richard L. Chiesa
*Attorney, Agent, or Firm*—Mark C. Jacobs

[57] ABSTRACT

An impact attenuator for installation along highways particularly at exit lanes from limited access roads is disclosed. The impact attenuator features the use of one or a plurality of novel crash cushions formed of polyurethane foam having a structure therein to help maintain the integrity of structure. The reinforcement may be a wire basket disposed therein. The attenuator is a device having a plurality of telescoping crash sections that nest upon impact.

11 Claims, 10 Drawing Figures

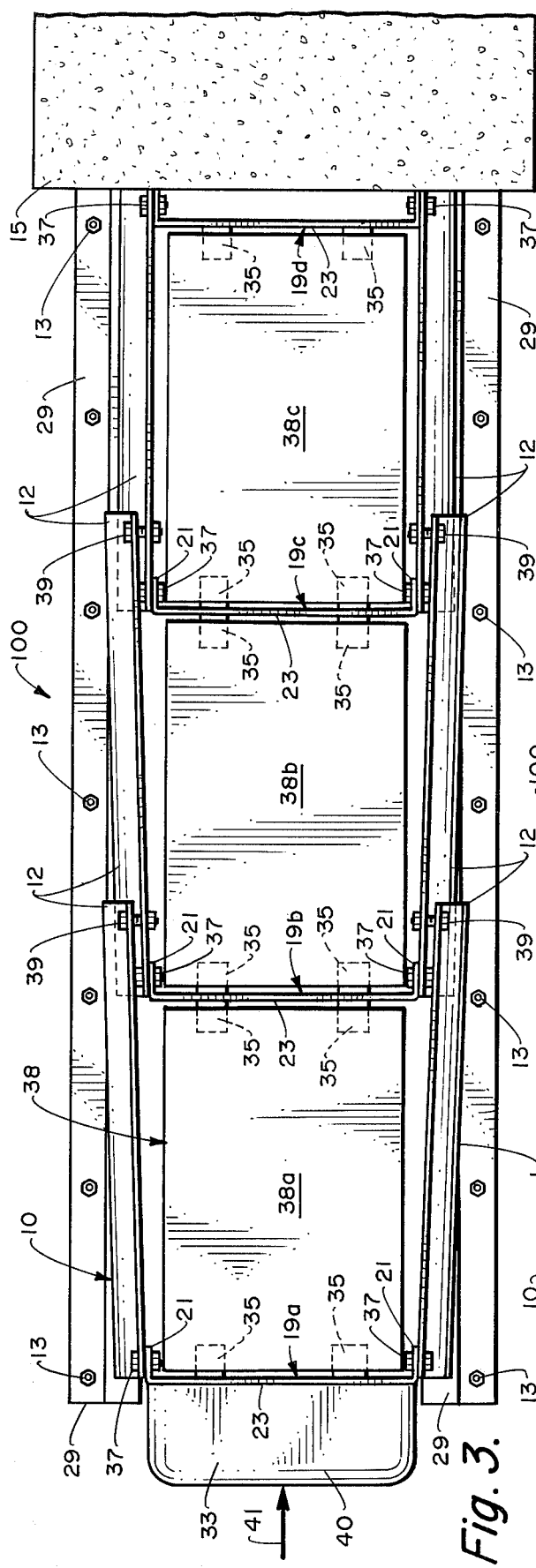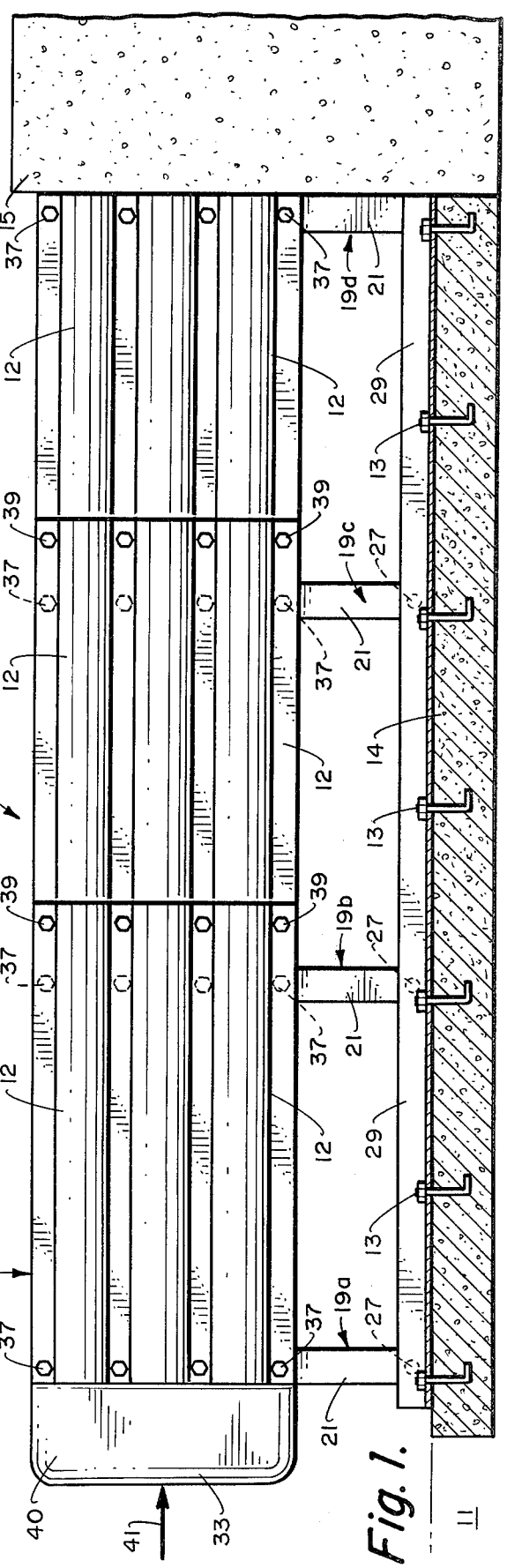
Fig. 3.
Fig. 1.

ENERGY ABSORBING IMPACT BARRIER

BACKGROUND OF THE INVENTION

1. Field of the Invention

The present invention pertains to an improved cell for use in an improved impact attenuation device used to protect vehicles from striking concrete abutments, sign posts, guard rails and the like along the nation's highways and especially at the intersection of an exit lane of the highway.

2. Description of the Prior Art

There is an increasing need to provide an attenuator for use along highways and the like, either in front of abutments or between highway lanes, that crashing vehicles can safely be arrested and kept from impacting superstructures, barriers and the like which are adjacent thereto.

The Federal Highway Administration has approved many specific crash barrier systems for such highway application. Among these systems are the so-called steel drum and High-Dry Cell sandwich systems which dissipate energy, primarily through a sacrificial crushing of the structure thereof. The other approved systems generally fall within a class of crash cushions which dissipate energy largely by momentum transfer.

Such cushion-type crash barrier systems have been employed along the nation's highways since the 1960's. Such systems are intended to provide impact protection for obstacles such as roadway gores, tunnel entrances, as well as bridge and freeway abutments.

One such cushion-type barrier is that of Walker, Ford & Meinzer in U.S. Pat. No. 3,666,055, issued May 30, 1972 for an energy absorbing device using a block of vermiculite to dissipate or transform the impact energy by the disintegration of the vermiculite cell block.

Another crash cushion known to Applicant is that disclosed in Meinzer U.S. Pat. No. 4,101,115 which is also vermiculite based.

Such crash cushions can be used in various attenuating devices such as those disclosed in the aforesaid U.S. Pat. No. 4,101,115 patent, and in the patent of Walker U.S. Pat. No. 3,944,187 issued Mar. 16, 1976, among others.

There exists, therefore, a need for an improved crash cushion, capable of energy dissipation and with which significant quantities of energy absorption can be realized at relatively low crushing force. There also exists a need for an improved energy attenuation device that would employ such an improved crash cushion.

It is, therefore, an object of the instant invention to provide an improved vehicular impact absorption system which utilizes a new crash cushion.

It is another object to provide an improved, economical and practical impact absorption system particularly suited for use in protecting structures situated along the highway.

It is another object to provide in an impact absorption system having a plurality of aligned crash cushions with the capability of protecting highway abutments from impacting vehicles.

It is a further object to provide in a vehicular impact absorption system a cushion which is reliable in operation, economic to fabricate and easy to install and maintain.

A still further object is to provide a crash cushion having increased compressibility over prior art cushions.

These and other objects and advantages are achieved through the use of an impact absorption system characterized by a plurality of aligned crash cushions, each cushion of the plurality being formulated from a unique combination of urethane foam forming reactants disposed in a container.

These and other objects will become more readily apparent with references to the following description and claims in light of the accompanying drawings.

BRIEF DESCRIPTION OF THE DRAWING

FIG. 1 is a right side elevational view of the impact barrier of this invention.

FIG. 3 is a top plan view thereof showing a plurality of the novel crash cushions of the invention in locus of utilization.

SUMMARY OF THE INVENTION

Figure 2:
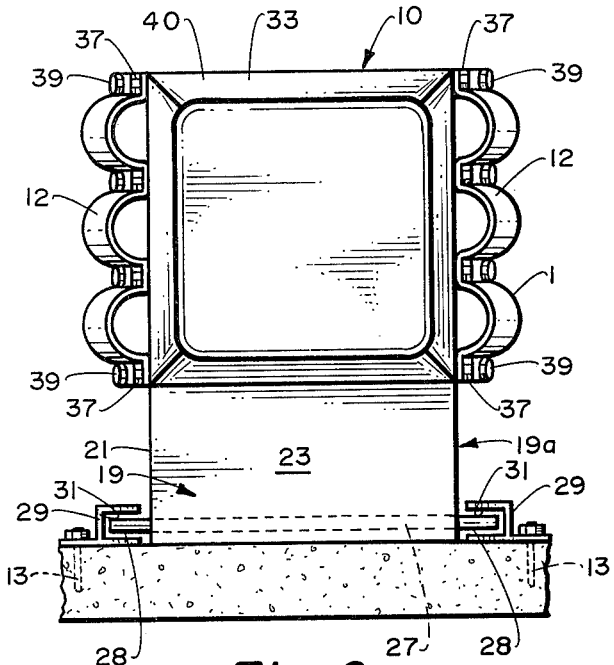
FIG. 2 is a front view of the barrier of this invention.

The present invention relates to a novel impact attenuator to be mounted on a concrete slab or to a concrete roadway comprising a plurality of upstanding header plates, having a pair of normally and rearwardly disposed flanges on the ends of the vertical edges thereof. Each of said headers is interconnected by two corrugated guard rails to the next header, one rail on the right and one on the left side.

The device rides within a track impact of a car with the nose of the device, the crash cushions resting on flanges between any pair of headers are crushed substantially without rebound thereby safely stopping the impacting vehicle.

The novel attenuator is intended to function using the novel crash cushion or cell of this invention. This cell is a filled urethane foam cell surrounding a specifically configured wire mesh therein.

DESCRIPTION OF THE PREFERRED EMBODIMENT

Referring now to the drawings, wherein like reference characters indicate like parts throughout the several figures, the reference number 10 indicating the impact attenuator of this invention and the designator 38 indicating the novel crash cushion that is mounted within the impact attenuator of this invention.

As shown in FIG. 1, device 10 is disposed along side a highway in protective relation with a concrete abutment 15. Such abutment would be situated at the intersection of an exit lane with the main highway, especially when said highway is elevated. It is of course, to be understood that the invention herein may be utilized to prevent impact with any type of abutment such as sign posts, lights, and the like, all within the concept of this invention.

Figure 6:
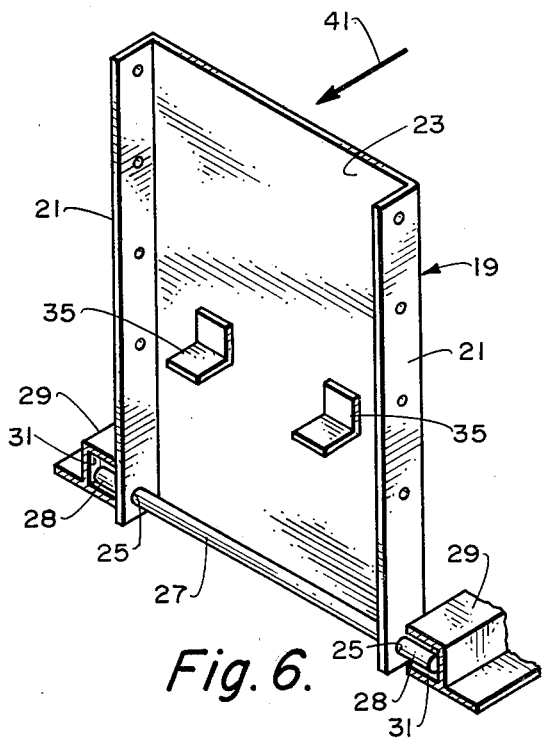
FIG. 6 is a detail perspective view of one portion of this invention.
Figure 4:
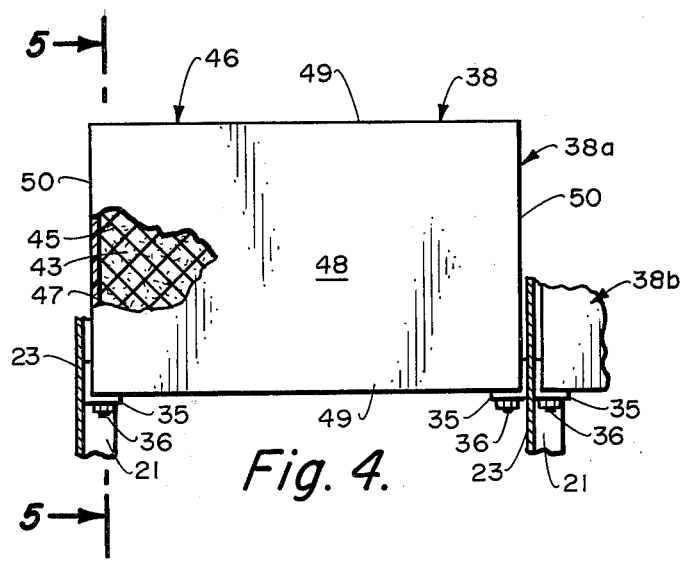
FIG. 4 is a side elevational view of the cell of this invention with portions removed for ease of understanding.

The system 100 comprises the novel structure 10 in conjunction with novel crash cushion 38 as is best seen from a review of FIG. 3. In the embodiment shown herein, a plurality of crash cushions 38A B, and C are shown. It is recognized that the device 10 of this invention, can be used with but one or as many as may be desired of said crash cushions. The system 100 includes the three crash cushions designated 38A, B and C, which are disposed in axial alignment resting on flanges 35 mounted on each header 23 on the front and rear sides thereof. Reference is made specifically to FIG. 6 wherein one pair of said flanges can be seen on the rear side of said header 23. Reference is also made to FIG. 4 which shows the mounting bolts 36 extending through suitable apertures in a pair of said mounting brackets 35. For ease of understanding, no headers are shown in FIG. 4. It is to be understood that each of the crash cushions employed herein is of a similar design even though not necessarily of similar configuration shape-wise, or dimension. For ease of manufacture, however, uniform cushions which are readily interchangeable with each other are suggested. Thus a detailed description of but a single crash cushion or cell as the term is frequently used in the trade, is deemed sufficient for complete understanding of that aspect of the invention.

In brief, a proposed cell 38 comprises a container or box 46 housing a filled urethane foam 43 in which there is embedded a basket 45. Various means are contemplated for the manufacture of said cell, the details on the chemistry of said cell are set forth elsewhere in this Application.

The system 100 of this invention may be erected in front of an abutment designated 15 in FIG. 1, or some other impediment to the safety of an oncoming vehicle's occupants. System 100 comprises device 10 mounted on a concrete pad 14, which pad may form part of the road bed, if the highway is also made of concrete or which base 14 may be embedded within the roadway material if said roadway material is asphalt for instance. Device 10 is seen to be as indicated above, mounted on a base 14. Device 10 comprises a plurality of headers 19, the plurality being the number of cells and 1 since there is one header at the front and rear of the array and one between each adjacent cell, as best seen in FIG. 6. Said headers are interconnected by a pair of lateral beams, one mounted on each side of said header. Each lateral buffer beam 12 is a conventional, longitudinally corrugated metal member of sufficient length to extend from flanges 21 of one header rearwardly to the corresponding flange on the same side of the next adjacent spaced apart header. Thus as can be seen in FIG. 3, each of said beams commencing at header 19B are overlapped a short distance such that they can be interconnected by shear bolts 39 between the first lateral beam 12 and the second of such beams, as well as said first and second beams being connected to said flanges 21 by main bolts 37. FIG. 2 shows main bolt 37 securing the first pair of rearwardly disposed lateral beams or guard rails attached to header 19A flange 21. Upon impact, shear bolts 39 are broken, thereby allowing guard rails 12 which are overlapped, to telescope inwardly as is desired for the dissipation of energy.

Each header 19 includes a main plate 23 and a pair of spaced flanges normal to said plate along the elevation edges thereof, upon said main plate are mounted on at least one side thereof, brackets 35 upon which crash cushions 38 rest in their operable position. Obviously, plates 19A and the last such header only include such mounting brackets on one side thereof. At the bottom of flange 21, there is drilled an aperture 25 through which apertures is inserted pin 27. Pin 27 is disposed parallel to said main plate 23, and a portion of said pin extends beyond each of said flanges 21 on said headers. Pin 27 is welded or otherwise suitably attached to said header 19. The two equally extending portions thereof 28 are seen to be disposed within the slot 31 of guide rail 29 without touching any portion of said guide rail.

The interconnection of each of said header 19 with its next adjacent header, by lateral beam 12, which each of said headers being potentially slidably mounted within guide rail 29, permits each header to telescope or move toward the next adjacent header only upon impact with the device, since the lateral beams are mounted in overlapping relationship one upon another commencing from the second header going rearwardly. The headers are seen, therefore, to be fixedly secured to each other thereby allowing a uniformly sized crash cushions to be disposed between each of said headers to further absorb the energy of impact upon soft nose 40 which is secured to the front side of headers 19A. Nose 40 may comprise a solid block of polyurethane elastomeric material which upon impact, will absorb the energy from the vehicle, and which will have insufficient resiliency to bounce the vehicle rearwardly back toward the line of traffic. If desired, instead of elastomeric material being employed, the nose 33 may comprise a structure fashioned like crash cushion 38 but suitably secured to the front side of main plate 23, said front beside proximal arrow 41 in FIG. 6. Nose 33 may be secured in any conventional manner as by adhesion with a suitable glue to main plate 23, See FIG. 1, or by bolting.

The lateral beams are secured to the headers by shear bolts which are destroyed by being shorn off by the compression forces on the cell, upon impact by a vehicle.

CRASH CUSHION

Figure 5:
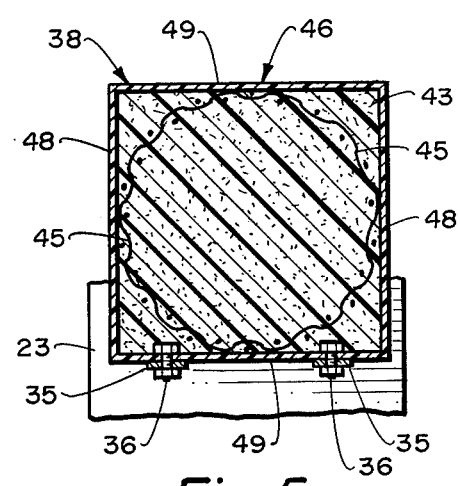
FIG. 5 is a view taken on the line 5—5 of FIG. 4.

The crash cushion of this invention as can be seen from FIGS. 2, 4 and 5, comprises a generally rectangular box having front and back ends 50, top and bottom opposed walls 49 and a pair of opposed sidewalls 48. Box 46 may be made of fiberglass, or other plastic material that is ruptureable upon impact, and is therefore, preferably not made of metal. Disposed within said box is a wire basket or core of once inch± mesh, tubular or square in shape, the open ing to said tube abutting the inner sides of end walls 50 per FIG. 5. Preferably, the elevation of sidewalls 48 and the width of the ends 50 are the same such as to present a container that appears square from a front viewing as per FIG. 5. Preferably the wire mesh tube has as its diameter, a dimension equal to the inside diameter of box 46 which, if square shaped in vertical cross-section would permit four points of tangency between said tubular basket 45 and said sidewalls 48. Again, reference is made to FIG. 5. The interior of said box 46 is filled with a rigid polyurethane foam material of a nature to be described below.

For ease of manufacture, it is seen that several ways of manufacturing the crash cushion of this invention are contemplated. The first mode requires the provision of a suitable container having the mesh basket disposed therein. Preferably the basket comprises one inch to two inch mesh of steel, aluminum, or a satisfactory plastic. The box 46 is formed of all walls but one, usually one of the end walls, which last wall can be sealed adhesively or by heat, to the balance of box 46, after insertion of the mesh basket 45. A suitable hole is drilled into said box, and the foam forming materials added for formation of an in place polyurethane foam. An alternate mode contemplates the foaming within a conventional mold of the urethane reactants and the required basket placed around the material after the removal of the preformed block from the mold and before its subsequent disposition within box 46. It is seen, however, that close tolerances will be required in order to have a tight fit of a preformed foam rectangular cube for insertion in box 46. Other modes of forming the crash cushion of this invention include using a cardboard box as the mold for the foam forming, sealing the cardboard box, and applying a suitable sealant material such as a paint, for weatherability of the cardboard box, the use of the weatherized box itself as the actual crash cushion. Still other modes of manufacture for the crash cushion are seen to exist and are within the skill of the art.

The term "basket" as utilized herein is intended to include both of a mesh basket and a self supporting structure of wire, glass fibre, or plastic fibre, open at least one end. Such a basket must be capable of being embedded into the filled foam during the foam forming process, or being capable of being wrapped around a foam block with a close fit such as to contain the foam within the basket. If an external structure is used, it must be loose enough not to crush the foam, yet tight enough to be held in place. The same is true for an externally applied mesh basket of any of the above materials. For that matter, interlaced wires spot welded at the crossover points, and formed to match the size and shape of a preformed block of foam can also be used, both for overwrapping, or for being foamed over such as to be embedded in the foam.

While a single helical winding is cheaper, it is also within the scope of the invention to use a plurality of spaced apart bands that are secured one to another by a few crossbands normal thereto to give rise to a rigid structure. For such a structure as this, wire, plastic or glass filaments may be employed.

The use of a wire mesh basket is most preferred, due to its ease of handling, low cost and ready availability.

While the use of banding techniques are known in the crash cushion art, specifically U.S. Pat. No. 3,666,055 the intent of that patent was to permit portions of the cell structure to escape between the bands upon the crushing to the cell by impact. Applicant herein, teaches away from such philosophy, as he desires to contain the foam within the basket to prevent portions of foam material from escaping upon crushing of the cell, to achieve his desired result of energy absorption without injury by the crushing of the urethane foam cells of the crash cushion (cell).

Figure 8:
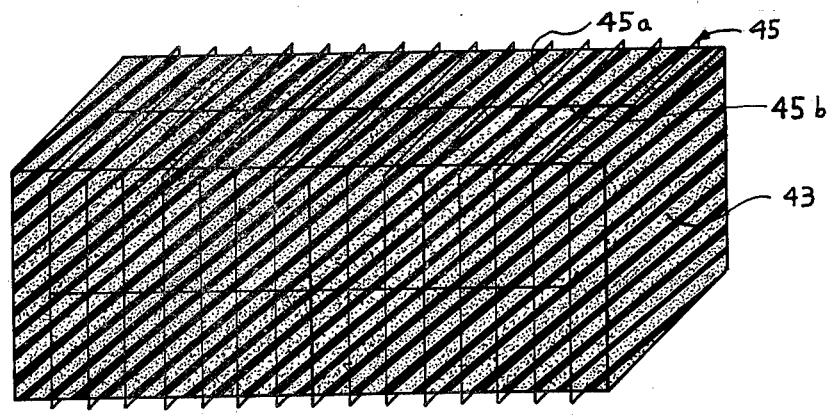
FIG. 8 is a perspective view of one embodiment of a portion of this invention.
Figure 9:
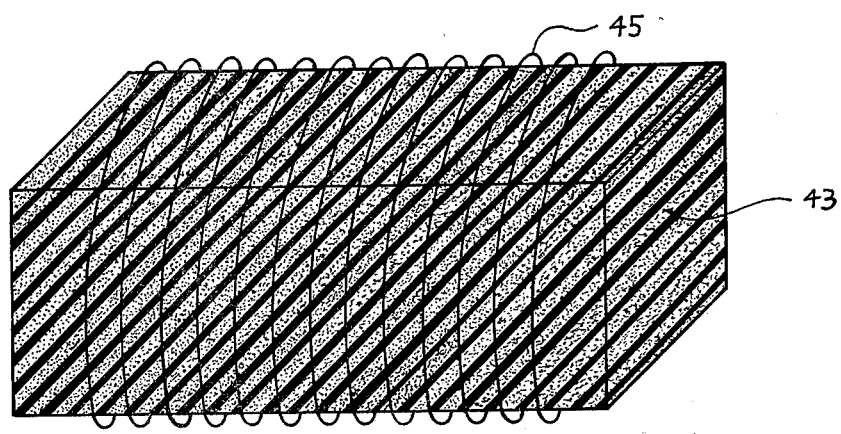
FIG. 9 is a perspective view of another embodiment of a portion of this invention.
Figure 10:
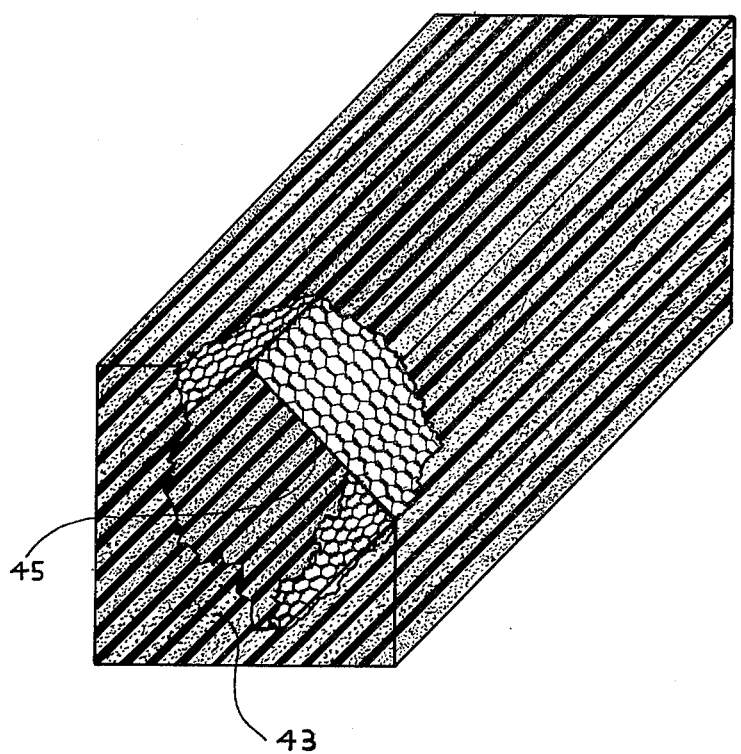
FIG. 10 is a cutaway perspective view of a third embodiment of a portion of this invention.

Reference made be made to FIGS. 8, 9, and 10 which illustrate several modes of basket used in conjunction with the foam. Thus FIG. 8 has a basket of interconnected straps or bands 45a bound by cross bands 45b to from a basket, 45 which is overlaid on a preformed foam block 43. FIG. 9's basket is a helical winding. FIG. 10 depicts a wire mesh basket embedded in a block of foam, ready for insertion into a fibreglass box. Obviously the rigid structures depicted in FIGS. 8 and 9 can be sized smaller for use in the embedding foaming technique, while the wire mesh basket can also be used for external application to a preformed foam block.

The polyurethane foam employed for this invention is a filled polyether based urethane foam of two pound density.

In accordance with the process for this invention, the polyether, the blowing agent, and an organic isocyanate compound are mixed together in any suitable device and after the components are completely mixed and before any substantial chemical reaction has occurred, the mixture is discharged or otherwise removed from the mixing zone and placed in box 46 or a suitable mold as the case may be, where chemical reaction between the components can proceed. Alternatively, the polyether and the organic isocyanate compound can be injected through a two tube gun into the reaction zone such that intimate mixing occurs as the two components are ejected through the nozzle and after the reactants have had the opportunity to interact, a foam will form in the mold. As previously indicated, a filler is added to the foam components, which have to be added as an a and b composition through a gun. A portion of the filler is added to each component. Otherwise, the filler is added to the mixture at the time of intimate mixing prior to the chemical reaction.

Mention may be made of talc, dolomite and diatomaceous earth as suitable fillers for the urethane foam used in this invention. The ratio of filler to reactant is within the range of fifteen to thirty percent by weight, with about twenty percent being preferred for the preferred filler commercially available talc. Any suitable polyether having terminal hydroxal groups and which has a molecular weight suitable for use in foam forming compositions may be employed. The polyether may be a linear compound prepared by the condensation of an alkaline oxide or by condensation of alkaline oxide with a glycol. Typical alkaline oxides include ethylene oxide and propylene oxide. In addition, other foam forming polyethers such as polyalkaline ether glycols prepared by the polymerization of such compounds as tetrahydrofuran as well as products prepared from the reaction of trihydroxy and dihydroxy compounds with suitable alkaline oxides are contemplated. A molecular weight range from about 1,000 to 6,000 is preferred for the polyether component used in this invention. Polyethylene 2,000 MW, polybutylene glycol 3,000 MW, a suitable amount of water equal to 1 MW $H_2O$/1NCO group is suggested for chain extensions and cross linking.

Any suitable organic dyisocyanate and polyisocyanate may be used in preparing the foam of this invention. For example, 1,5-napthaleyne dyisocyanate, para-phenylene dyisocyanate, hexa-methalene dyisocyanate and para-phenelene dyisocyanate, and any of the commercially available tryisocyanate compounds are contemplated. However, 2,4- and 2,6-tolylene dyisocyanate are preferred as they are readily available commercially. The use of NCO terminated prepolymers for "one shot" processes are also contemplated herein.

Any suitable blowing agent such as the Freons TM as manufactured by E. I. DuPont, DeNemours are contemplated for use herein. Other conventional blowing agents may also be employed.

It is within the skill of the art to alter the ingredients utilized herein to achieve the desired characteristics of the foam, namely a two pound density rigid foam, which upon impact, will display little or no memory, and as such will absorb the energy from impact with the dissipation of gas by the rupturing of the foam cells. As will be discussed elsewhere herein, the crash cushion of this invention ruptures, upon the absorption of impact energy, but the cushion stays together due to the presence of the internal wire mesh basket.

Those skilled in the art will recognize that other ingredients conventional in the polyurethane foam forming art, may also be included within the formulation. The exact formulation herein forms no part of this invention, Applicant's discovery being the fact that a filled foam of the two to six pound density forms an excellent crash cushion when used in conjunction with a device that maintains the integrity of the cushion, namely wire basket 45.

Applicant is aware of the fact that other foam forming materials such as styrene beads and non-filled urethane foams as well as vermiculite materials have been used previously or may have been suggested for use in crash cushions. Various problems have been found to be associated with such cushion forming materials, primarily, the memory or such materials to rebound to their original demensions upon recovery from impact. On the other hand, the foam of this invention absorbs the impact and crushes with little or no rebound.

Figure 7:
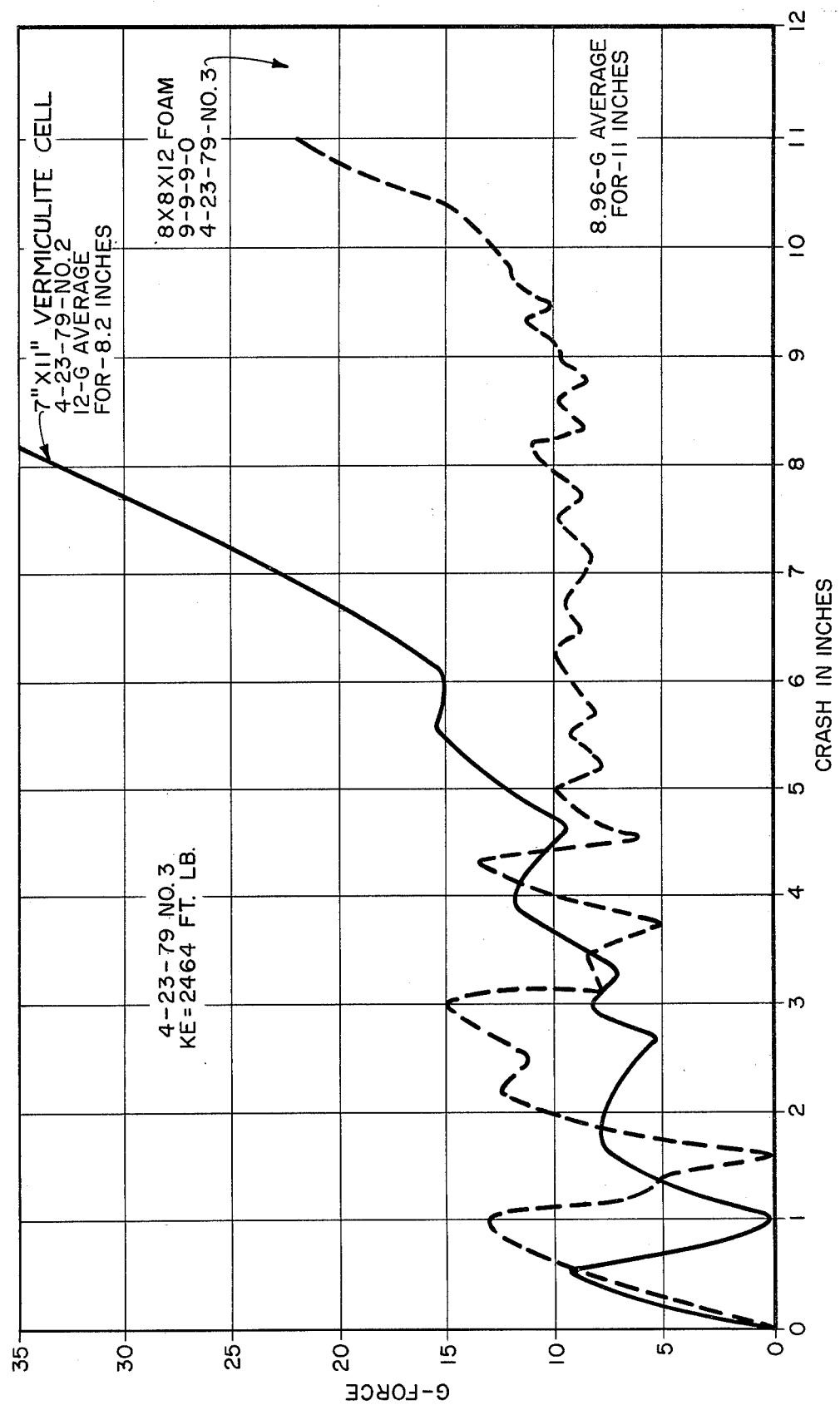
FIG. 7 is a graphic illustration comparing crash test data of a plot of crash versus G force for a prior art cell and the crash cushion cell of this invention.

Crash cushions formulated from polyurethane over an inter meshed basket as prepared in accordance with this invention, were compared with crash cushions prepared according to the disclosure of U.S. Pat. No. 4,101,115 issued July 18, 1978 with respect to the ability to absorb energy and its compressibility. In addition, the crash cushions disclosed in U.S. Pat. No. 3,666,055 were also considered. The structure of the aforementioned '055 patent is sixty percent usable compressibility that of the '115 patent is seventy to seventy five percent compressibility and that of the instant Application approximately ninety percent compressibility. Reference is made to FIG. 7 which compares a twelve inch sample in thickness of both the vermiculite crash cushions used in U.S. Pat. No. 4,101,115 and the crash cushion of this invention. It is seen that the crush extended for a twelve inch sample in thickness eight by eight, that is suitably sized for the testing equipment, that the G force level is approximately even spread across all the way until past ten inches of the twelve inch sample at which point the curve rises. On the other hand, for a seven by eleven vermiculite sample, the curve rises just past five inches of crush. The x axis represents the compressibility while the y axis is set forth in G forces. For this example, the Ke applied was 2,464 ft. lbs. which simulates the impact of an automobile against the crash cushion of both the prior art and this invention.

USE AND OPERATION

The operation of the described embodiment is deemed to be readily apparent, however, for the sake of clarity, it will be discussed in brief.

When the system 100 is assembled as shown in FIG. 3 with the track being secured to the concrete base by pins 13 and the plurality of crash cushions 38 being placed in operative position upon two pairs of opposed mounting brackets 35 the system 100 is ready for use. The vehicle in most instances will impact against nose 40. As nose 40 absorbs the impact, the first header 19A is urged rearwardly along the guide rail 29 and the first set of shear bolts 39 adjoining lateral beams 12 from header 19A to the second set of guard rails in an overlap configuration are sheared, thereby permitting the first set of guard rails to telescope and flex outwardly whereby header 19A is directed toward 19B. Structural integrity of the system is maintained since lateral beam (guard rail) joining header 19A is also secured to 19B. This junction tends to aid header 19A in being slidably moved rearwardly in the direction of arrow 41 along the guide rail 29. Note that the guide rail channels face each other.

Substantially simultaneously, since the gap between the rear side of header 19A and the front end wall of the first crash cushion 38 is very slight, the impact energy is directed to crash cushion 39. The individual cushions begin to collapse under a compressive force. Energy is dissipated at a controlled rate determined in part, by the number of headers and the number of crash cushions employed in the system 100. In practice, is has been found that a system employing three cushions with corresponding four headers, provides good stopping results with little or no damage to either the abutment intended to be protected as well as do as little damage as possible to the occupants of the vehicle. After the first crash cushion has been compressed, it will be urged toward front wall of the header 19B which in turn will impact upon the second cushion 38 while the second set of shear bolts 39 are severed and the second set of guard rails are deformed outwardly in an accordian pleat configuration. This chain of events will continue from cushion to cushion until all the energy from the impact of the vehicle has been absorbed.

Even if the impact of the vehicle is not head on into nose 40 but rather is a glancing blow to the side or is head on to the side of the device 10, it is believed that the configuration of the system 100 with device 10 being movably compressible within track 29 coupled with the high compressibility of the crash cushion of this invention, that the system can absorb such blows with minimal damage to the occupants of the vehicle. Thus, the framework of the device 10 will not be readily dislodged sideways upon such a glancing or side initial impact from the vehicle.

Actual high speed crash tests of the structures of the nature disclosed herein, have demonstrated that the system 100 remains the substantially self contained even after severe frontal or glancing impact. The system is effective to reduce the speed of the impacting vehicle quite promptly and does not require any special servicing in order to be restored to operability once the impacting vehicle has been removed. It is seen, therefore, that the system of this invention affords a greatly improved arrangement for maintaining safe conditions against impact for abutments and other structures along the highway.

Once the impacting vehicle has been removed, should any headers need replacement, they are removed from the track, new ones inserted in their place, and new guard rails 12 bolted in overlapping fashion as shown in FIG. 3 from header to header. Only the first and last headers lack a pair of guard rails bolted thereto in accordance with the construction of this invention. A new nose 40 is adhesively applied or otherwise anchored to the leading edge of the first header 19A. Replacement cells 38 are placed on mounting brackets 35 and the whole system 100 is ready for operation again within several hours of the accident, with all work being done by relatively unskilled personnel.

When setting up replacement cells, or at the time of first setup, care should be taken to see that the ends of wire or filament used for external baskets are turned inward and inserted into the foam, as an extra safety precaution, and to prevent possible damage to the box 46. Care should preferably be taken to ensure that the successive coilings are not overly spaced apart, as such would act contrary to applicant's desire of foam containment.

It is seen that there has been disclosed herein a new crash cushion, for use in a new impact attenuator. It is recognized, however, that prior art crash cushions could be employed with the structure of device 10, but superior results are gained by using the novel crash cushions with the device of this invention. On the other hand, it is recognized that other types of cells can be employed within the structure of device 10 of system 100. However, it must be recognized that prior art cells are generally heavier for similar dimensions, and as such, are more difficult to restore by one or two man crews. This is especially true, when one recognizes the fact that a typical crash cushion is approximately 24"×24"×36" deep.

As is readily apparent, as the headers are urged toward each other upon impact, the crash cushions collapse at a decreasing rate as the impact energy is dissipated. Due to the fact that each of the cells collapses independently of all the preceeding cells, the vehicle imbeds itself into the system 100 and thus is captured and prevented from rebounding back onto the roadway as its motion is arrested. The arresting is carried out by the combination of the unique structure of device 10 as well as by the nature of the compressible crash cushion employed herein which cushion has little or no resiliency.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. An energy absorbing impact barrier for a fixed structure comprising:
   (a) a collapsing energy absorbing and dissipating means comprising at least one crash cushion cell positioned in an ordered array extending forwardly,
   (b) one of a plurality of upstanding headers disposed on opposite ends of the array and between each of said cells, said headers having a main plate and a pair of opposed flanges normal to said plate, each flange having an aperture therein in coplanar alignment with the aperture on the corresponding opposed flange.
   (c) brackets for the disposition of said crash cushion cells mounted on at least one side of said main plates, said cells being disposed upon said brackets,
   (d) an elongated pin attached horizontally along the bottom of said main plate, and having two equally extending portions, each of which projects through one of said apertures,
   (e) a pair of generally parallel spaced guide rails each having a channel that faces the channel of the other, each projecting ends of said pin being disposed in one of said channels,
   (f) each of said headers being interconnected to the next of said headers by a pair of non-rigid lateral beams one of which beams extends from the flange of one of said headers to the flange of the next adjacent header on the same respective side of said header, and the other of which interconnects in like manner in the opposite side of said header, in overlapping relationship,
   the first of which headers has a nose comprising a block of impact absorbing material mounted thereon of insufficient resiliency to bounce an impacting vehicle back into traffic.

2. The impact barrier of claim 1 wherein the nose is a block of polyurethane elastomer.

3. The impact barrier of claim 1 wherein the nose comprises a box containing a filled polyurethane foam of about 2 to 6 pound density, having a basket disposed along the length of said box.

4. The impact barrier of claim 3 wherein the basket is a self supporting wire helix surrounding said foam.

5. The impact barrier of claim 3 wherein the basket is a mesh basket.

6. The impact barrier of claim 3 wherein the basket is comprised of interconnected spaced bonds that surround said polyurethane foam.

7. The barrier of claim 1 wherein the elastomeric nose is polyurethane.

8. The barrier of claim 1 further wherein each crash cushion cell in the array is a box containing a filled polyurethane foam having a basket embedded therein.

9. The barrier of claim 1 wherein each crash cushion in the array is a fiberglass box containing a filled polyurethane foam of about 2 pound density having a tubular wire mesh basket embedded therein.

10. The barrier of claim 9 wherein the polyurethane foam is filled with a filler selected from the group consisting of talc, dolomite and diatomaceous earth in the range of from about 15% to about 30% by weight of the foam.

11. The energy absorbing impact barrier of claim 1 wherein there are three cushions in the array and a header front, aft, and between each cushion.

* * * * *